(12) United States Patent
Toney

(10) Patent No.: US 6,934,441 B2
(45) Date of Patent: Aug. 23, 2005

(54) WAVELENGTH SEPARATION DEVICES INCORPORATING MULTI-BARRIER PHOTONIC HETEROSTRUCTURES

(75) Inventor: James E. Toney, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 164 days.

(21) Appl. No.: 10/658,122

(22) Filed: Sep. 9, 2003

(65) Prior Publication Data

US 2005/0053326 A1 Mar. 10, 2005

(51) Int. Cl.[7] .............................................. G02B 6/293
(52) U.S. Cl. ........................................................ 385/24
(58) Field of Search ............................. 385/24, 27, 39

(56) References Cited

U.S. PATENT DOCUMENTS

| | | |
|---|---|---|
| 5,335,240 A | 8/1994 | Ho et al. |
| 5,406,573 A | 4/1995 | Ozbay et al. |
| 5,440,421 A | 8/1995 | Fan et al. |
| 5,600,483 A | 2/1997 | Fan et al. |
| 5,740,287 A | 4/1998 | Scalora et al. |

(Continued)

FOREIGN PATENT DOCUMENTS

| | | | |
|---|---|---|---|
| EP | 0 953 853 A | 11/1999 | |
| WO | WO 98 53350 A | 11/1998 | |
| WO | WO 01 77726 A | 10/2001 | |
| WO | WO 02/44672 A2 | 6/2002 | |

OTHER PUBLICATIONS

Gadot F. et al: "Transmission Resonances in Ultra–Wideband Composite Metallic Photonic Crystals", Electronic Letters, IEE Stevenage, GB, vol. 35, No. 6, Mar. 18, 1999, pp. 478–480.

Sato et al.; 3–D Photonic–Crystal Heterostructures: Fabrication and In–Line Resonator: IEEE Photonics Technology Letters; Jun. 2003; pp. 816–818; vol. 15, No. 6.

John et al.; Photonic Band Gap Materials: A Semiconductor for Light; pp. 1–23, pub source and date unknown.

Fan et al.; Channel Drop Filters in Phontonic Crystals; Optics Express; Jul. 1998; pp. 4–11; vol. 3, No. 1.

*Primary Examiner*—John D. Lee
*Assistant Examiner*—Mike Stahl
(74) *Attorney, Agent, or Firm*—Dinsmore & Shohl LLP

(57) ABSTRACT

A wavelength separation device is provided comprising a plurality of optical heterostructures. The optical heterostructures are characterized by distinct transmission bandwidths. Each of the plurality of optical heterostructures comprises a first bandgap region and a second bandgap region defined in a matrix of the optical heterostructure. The first bandgap region defines a first optical bandgap of the optical heterostructure. The second bandgap region defines a second optical bandgap of the optical heterostructure. The first optical bandgap of the optical heterostructure is centered at a different wavelength than the second optical bandgap of the optical heterostructure such that one of the transmission bandwidths is defined between the first and second optical bandgaps.

20 Claims, 7 Drawing Sheets

U.S. PATENT DOCUMENTS

| | | |
|---|---|---|
| 5,748,057 A | 5/1998 | De Los Santos |
| 5,784,400 A | 7/1998 | Joannopoulos et al. |
| 5,973,823 A | 10/1999 | Koops et al. |
| 5,998,298 A | 12/1999 | Fleming et al. |
| 6,042,998 A | 3/2000 | Brueck et al. |
| 6,058,127 A | 5/2000 | Joannopoulos et al. |
| 6,075,640 A | 6/2000 | Nelson |
| 6,101,300 A | 8/2000 | Fan et al. |
| 6,134,043 A | 10/2000 | Johnson et al. |
| 6,388,795 B1 | 5/2002 | Fleming et al. |
| 6,392,787 B1 | 5/2002 | Cirelli et al. |
| 6,396,617 B1 | 5/2002 | Scalora |
| 6,404,947 B1 * | 6/2002 | Matsuda ................. 385/24 |
| 6,448,997 B1 | 9/2002 | Koide |
| 6,560,006 B2 | 5/2003 | Sigalas et al. |
| 6,707,597 B2 * | 3/2004 | Hamada ................. 359/321 |
| 2001/0012149 A1 * | 8/2001 | Lin et al. ................. 359/344 |
| 2001/0019565 A1 | 9/2001 | Iwasaki et al. |
| 2002/0009277 A1 | 1/2002 | Noda et al. |
| 2003/0031438 A1 | 2/2003 | Kambe et al. |
| 2003/0039446 A1 * | 2/2003 | Hutchinson et al. ........ 385/39 |
| 2003/0043870 A1 | 3/2003 | Shchukin et al. |
| 2003/0056546 A1 | 3/2003 | Claus et al. |
| 2003/0123827 A1 * | 7/2003 | Salemo et al. ............ 385/129 |

\* cited by examiner

US 6,934,441 B2

WAVELENGTH SEPARATION DEVICES INCORPORATING MULTI-BARRIER PHOTONIC HETEROSTRUCTURES

CROSS-REFERENCE TO RELATED APPLICATIONS

This application is related to U.S. patent application Ser. No. 10/658,105 filed Sep. 9, 2003.

BACKGROUND OF THE INVENTION

The present invention relates generally to the propagation, direction, conditioning and other control of optical signals in optical devices and, more particularly, to the use of photonic bandgap structures in optical devices capable of operating as a wavelength separation device. Modern telecommunications networks, for example, utilize a variety of optical components to affect control of optical signals and the present invention presents a scheme for enhancing the performance of such networks by utilizing photonic band gap structures in the networks. It is noted that reference herein to "bandgap" structures or devices incorporates not only bandgap structures where transmission of a selected wavelength of radiation is inhibited in all directions, but also structures or devices that are spatially selective with reference to the propagation of a particular wavelength of radiation, i.e., structures where transmission of a selected wavelength of radiation is inhibited in one direction, or less than all directions.

For the purposes of defining and describing the present invention, it is noted that the use of the term "optical" throughout the present description and claims is not intended to define a limit to any particular wavelength or portion of the electromagnetic spectrum. Rather, the term "optical" is defined herein to cover any wavelength of electromagnetic radiation capable of propagating in a waveguide. For example, optical signals in the visible and infrared portions of the electromagnetic spectrum are both capable of propagating in an optical waveguide. A waveguide may comprise any suitable signal propagating structure. Examples of waveguides include, but are not limited to, optical fibers, slab waveguides, ridge waveguides, and thin-films used, for example, in integrated optical circuits. Complex optical devices such as optical networks, isolators, circulators, multiplexers, demultiplexers, wavelength lockers, modulators, variable attenuators, dispersion compensators, power monitors, lasers, amplifiers, detectors, routers, switches, interleavers, and combinations thereof, can be configured to incorporate optical waveguides.

BRIEF SUMMARY OF THE INVENTION

A wavelength separation device is provided comprising a plurality of optical heterostructures. The optical heterostructures are characterized by distinct transmission bandwidths. Each of the plurality of optical heterostructures comprises a first bandgap region and a second band gap region defined in a matrix of the optical heterostructure. The first bandgap region defines a first optical bandgap of the optical heterostructure. The second bandgap region defines a second optical bandgap of the optical heterostructure. The first optical bandgap of the optical heterostructure is centered at a different wavelength than the second optical bandgap of the optical heterostructure such that one of the transmission bandwidths is defined between the first and second optical bandgaps.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
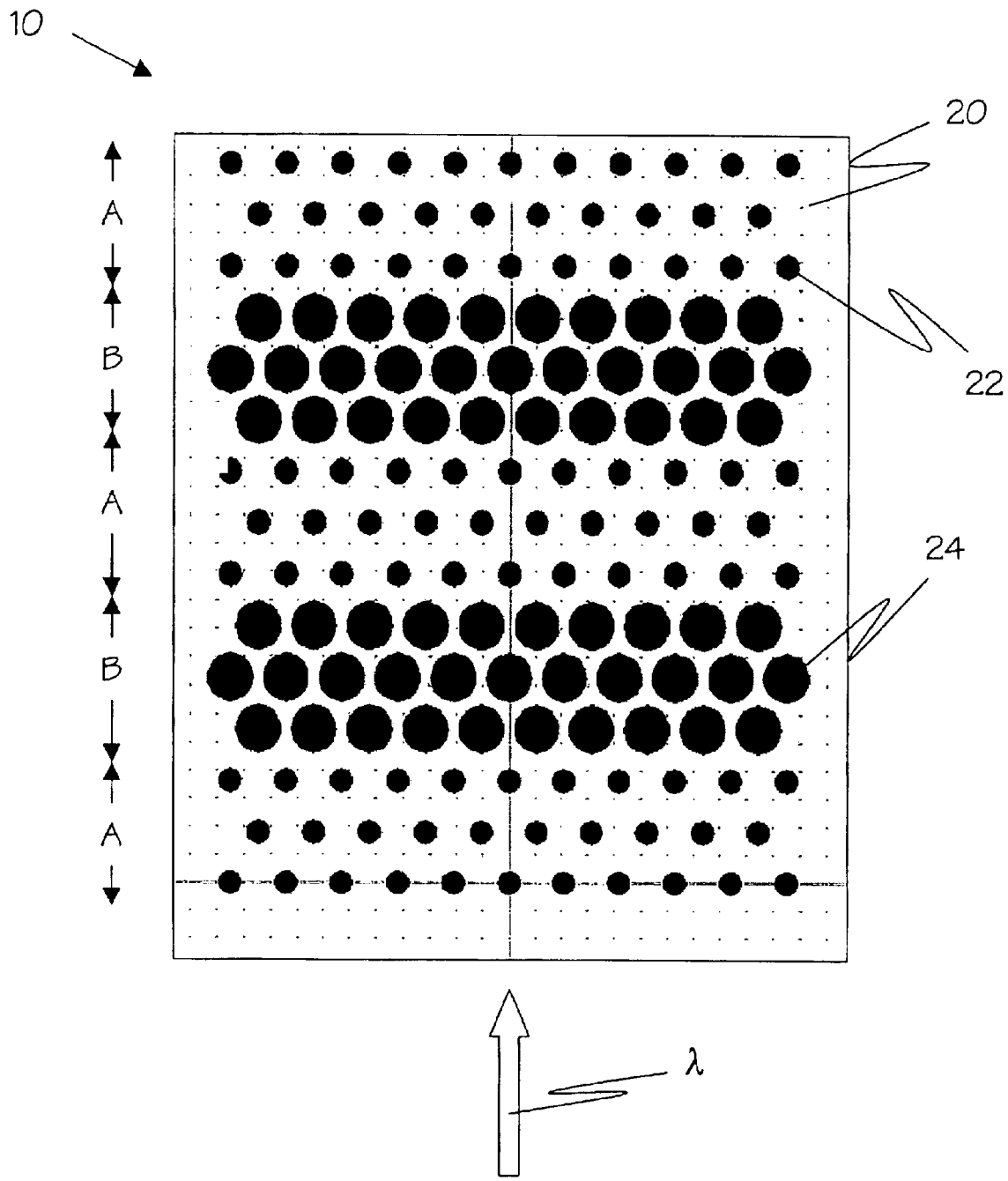
FIG. 1 is an illustration of an optical heterostructure according to one embodiment of the present invention.

Referring to FIG. 1, an optical heterostructure 10 according to the present invention is illustrated. The optical heterostructure comprises a matrix 20 and first and second sets of bandgap regions A, B defined therein. The first set of bandgap regions A is characterized by a periodic arrangement of first inclusions 22 in the matrix 20. The periodic arrangement of the first inclusions 22 in the matrix 20 defines a first optical bandgap of the optical heterostructure 10. The second set of bandgap regions B is characterized by a periodic arrangement of second inclusions 24 in the matrix 20. The periodic arrangement of the second inclusions 24 in the matrix 20 defines a second optical bandgap of the optical heterostructure 10.

For the purposes of defining and describing the present invention, it is noted that the term "heterostructure" is merely intended to denote a structure, object, region, or other type of identifiable matter that includes two or more types of identifiable components. For example, the optical heterostructure 10 illustrated in FIG. 1 comprises at least three different identifiable components—the matrix 20, the first inclusions 22, and the second inclusions 24.

Figure 4:
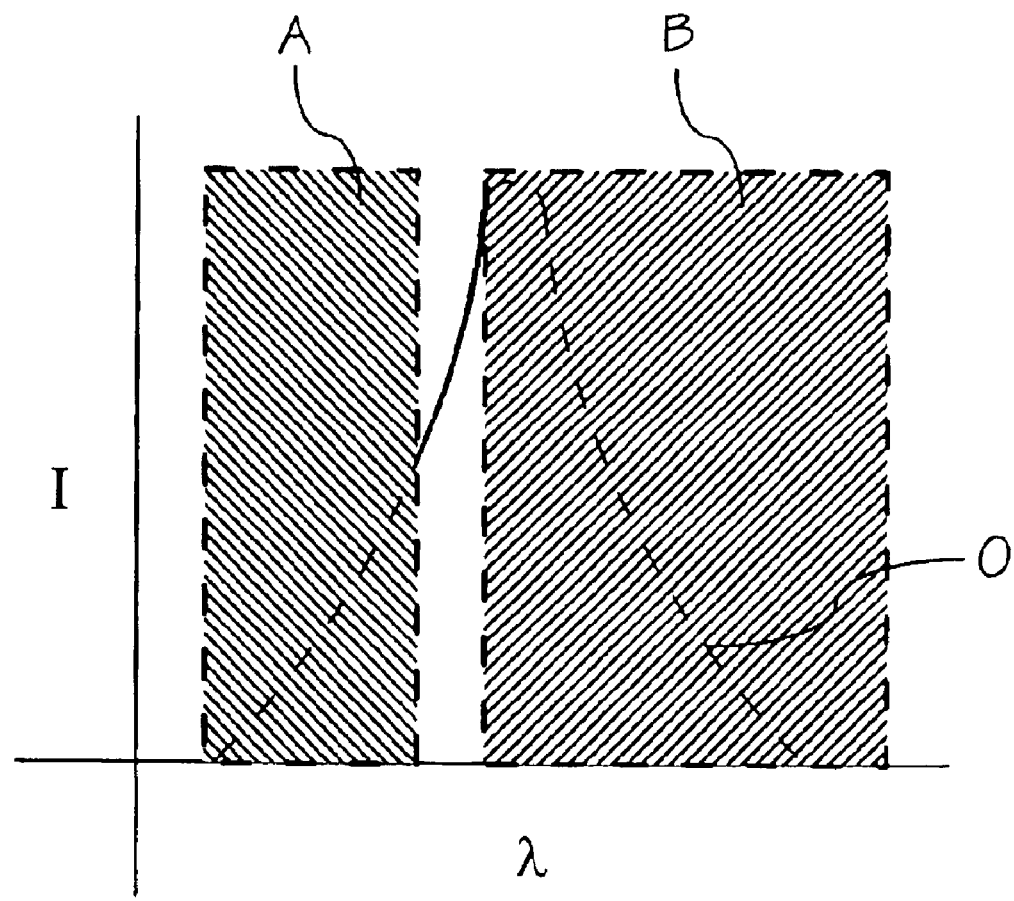
FIG. 4 is a representation of the manner in which a multi-barrier photonic heterostructure device according to the present invention operates to generate a well-defined, narrow bandwidth optical signal from a broadband light source.

The respective characteristics of the optical bandgaps will vary depending upon the requirements of the particular context in which a device according to the present invention is to be utilized. The first optical bandgap is typically centered at a different wavelength than the second optical bandgap and the bandgaps may define different optical widths. For example, and not by way of limitation, referring to FIG. 4, where a narrow band optical signal is to be generated from a broadband or multi-component light source O of a wavelength centered around 1.5 $\mu$m, the second set of bandgap regions B may be characterized by a relatively wide band gap centered near 1.5 $\mu$m and the first set of bandgap regions A may be characterized by a more narrow band gap centered at a shorter wavelength of about 1.45 $\mu$m. Of course, a wide variety of bandgap characteristics will be suitable for various embodiments of the present invention.

Regarding the specific design considerations affecting the band gap characteristics, it is initially noted that the first and second inclusions 22, 24 have an index of refraction substantially different from the index of refraction of the matrix 20. The matrix 20 may have a relatively high index of refraction while the first and second inclusions 22, 24 have a relatively low index of refraction; or, the matrix 20 may have a relatively low index of refraction while the first and second inclusions have a relatively high index of refraction. For the purposes of describing and defining the present invention, it is noted that indices of refraction that are substantially different or substantially high versus low, define values different enough to establish a waveguide structure permitting efficient propagation of an optical signal λ. For example, in applications where optical heterostructures of the present invention are to be compatible with silica-based waveguides, it is contemplated that suitable indices of refraction of the material forming the first and second inclusions will range from about 1.0 to about 1.5, assuming lower index inclusions in a higher index medium, or from about 1.5 to about 3.5, assuming higher index inclusions in a lower index medium.

Typically, the first and second inclusions 22, 24 are made of the same material and have substantially identical indices of refraction. However, it is contemplated that the first and second inclusions 22, 24 may be formed of different materials and may have different indices of refraction. Suitable materials for the first and second inclusions include, but are not limited to, materials selected from air, an inert gas, silica, a polymer, an aqueous material, and combinations thereof. Similarly, suitable materials for the matrix include, but are not limited to, materials selected from air, an inert gas, silica, a polymer, an aqueous material, and combinations thereof.

The wavelength difference in the first and second optical bandgaps may be attributable to one or more of the following factors: (i) a difference in respective geometries of the first and second inclusions; (ii) a difference in respective sizes of the first and second inclusions (as is the case in FIG. 1); (iii) a difference in the respective periodicities of the first and second inclusions; and (iv) a difference in the respective compositions of the first and second inclusions. In FIG. 1, each of the first inclusions 22 approximate a geometrical shape that is substantially the same as a geometrical shape approximated by each of the second inclusions 24 (i.e., a circle in cross section). However, it is contemplated that, the first inclusions 22 may approximate a geometrical shape that is substantially different than the geometrical shape approximated by the second inclusions 24 (e.g., circles-vs-squares). In any event, it is noted that the first and second inclusions may approximate one or more of a variety of geometrical shapes. It is also noted that differences in sizes may be represented by different cross-sectional areas or volumes. Again, by way of illustration and not limitation, suitable inclusion sizes will range from about 0 µm to about 0.5 µm in radial cross section, for visible or near-infrared frequencies. Suitable inclusion periodicities may range from a spacing periodicity of between about 0.3 and about 0.6 µm, for visible or near-infrared frequencies.

In FIG. 1, the periodicity approximated by the first inclusions 22 is substantially the same as the periodicity approximated by the second inclusions 22. However, it is noted that the periodicity of the first and second inclusions 22, 24 may be varied, particularly where the sizes of the first and second inclusions 22, 24 are the same. A variety of lattice geometries may be utilized according to the present invention to define the respective periodicities of the first and second bandgap regions A, B. For example, suitable lattice geometries include, but are not limited to, square, cubic, hexagonal, tetragonal, etc., and the features within them could be cylinders, squares, rectangles, hexagons, etc.

The present invention may also be conceptualized by describing the first and second bandgap regions A, B as each comprising different respective optical mediums. Specifically, referring to FIG. 1, bandgap region A comprises two optical mediums 20, 22 while bandgap region B comprises two optical mediums 20, 24. One of the optical mediums in each bandgap region has a relatively high index of refraction while the other optical medium in the bandgap region has a relatively low index of refraction. In each of the bandgap regions A, B, the high index optical medium and the low index optical medium are arranged in a periodic lattice and define a unique optical bandgap having a characteristic center wavelength and width.

As is illustrated in FIG. 1, the first and second bandgap regions A, B alternate along a primary dimension of optical propagation of the heterostructure device 10 to define a plurality of first bandgap regions A and a plurality of second bandgap regions B and yield a two-dimensional photonic bandgap structure. Although not illustrated in the Figs., it is contemplated that the first and second bandgap regions A, B may further alternate along a dimension orthogonal to the primary dimension of optical propagation of the heterostructure device to define a three-dimensional photonic bandgap structure. Similarly, although the Figs. illustrate output signals along one primary dimension of the structure, it is contemplated that the device may be configured to generate output signals in a variety of directions, including those parallel to the incident signal, orthogonal to the incident signal, or at any angle relative to the incident signal.

Although the present invention is illustrated with the inclusion of only two different types of bandgap regions A, B, it is noted that the optical heterostructure 10 may further comprise one or more additional band gap regions. The additional bandgap regions would be characterized by a periodic arrangement of additional inclusions in the matrix 20 to define one or more additional optical bandgaps in the optical heterostructure 10. Each of the additional optical bandgaps may be centered at a different wavelength than the first and second optical bandgaps. As is noted above in the case of the dual bandgap structure, the first, second, and additional bandgap regions may alternate along the primary dimension of optical propagation and the orthogonal dimensions of optical propagation.

The matrix 20 is illustrated in FIG. 1 as defining a substantially homogenous composition throughout the optical heterostructure 10. However, it is noted that the matrix 20 may define a substantially heterogeneous composition throughout the optical heterostructure. For example, the composition of the matrix 20 may vary from bandgap region A, B to the next. It is further noted that a substantially heterogeneous matrix may have an index of refraction that varies spatially throughout the heterostructure 10. Suitable matrix materials include, but are not limited to, materials selected from Si, In, Ga, Al, Sb, As, Ge, P, N, O, $BaTiO_3$, lithium niobate, GaAs, InP, InGaAsP, a semiconductor, a chalcogenide, a polymer, an organic material, and combinations thereof. The matrix 20 may comprise a dopant, e.g., an optically active material like erbium or another rare earth element.

Figure 2:
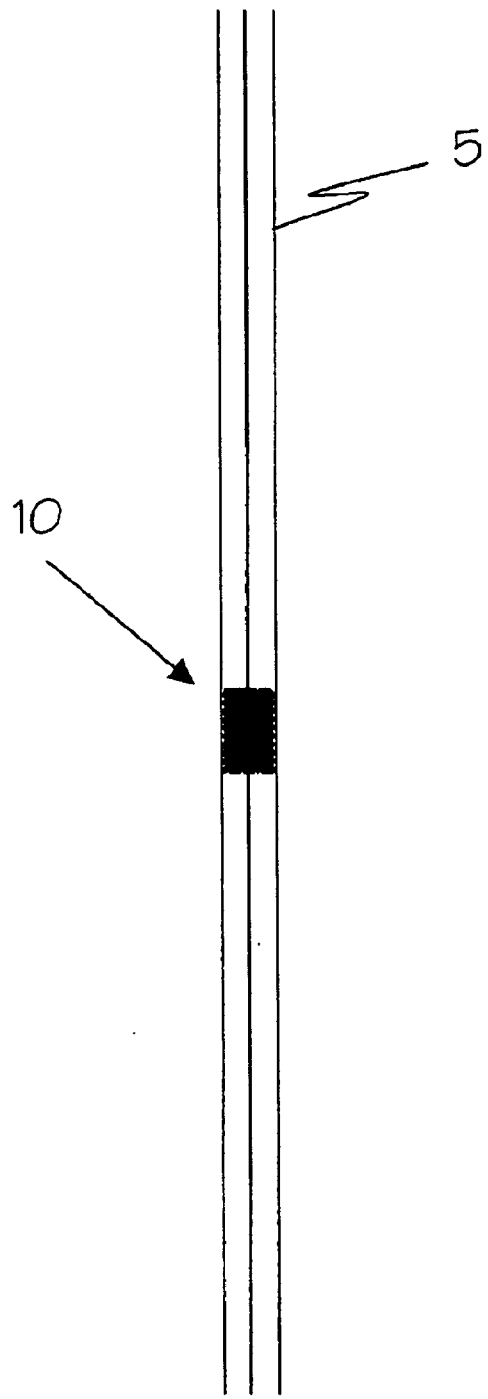
FIG. 2 is an illustration of an optical waveguide incorporating an optical heterostructure according to one embodiment of the present invention.

Referring now to FIG. 2, it is noted that the optical heterostructure 10 of the present invention may be employed in any one of a variety of types of optical waveguides 5. A core region of the optical waveguide 5 defines a primary dimension of optical propagation. The core region is bounded by a boundary region along the primary dimension of optical propagation. The optical heterostructure 10 of the present invention is defined in a heterostructure region of the core.

The core region of the waveguide may have a relatively high index of refraction while the boundary region has a relatively low index of refraction. The boundary region may comprise air, silicon dioxide, a material characterized by an index of refraction approximating that of air or silicon dioxide, or combinations thereof. It is noted that the boundary region may comprise a combination of spatially distinct regions, e.g., air above the core and silicon dioxide on each side of the core. It is noted that, intermediate layers or regions of material may exist between the core and the boundary region without departing from the bounded relationship of the core and the boundary regions.

Figure 3:
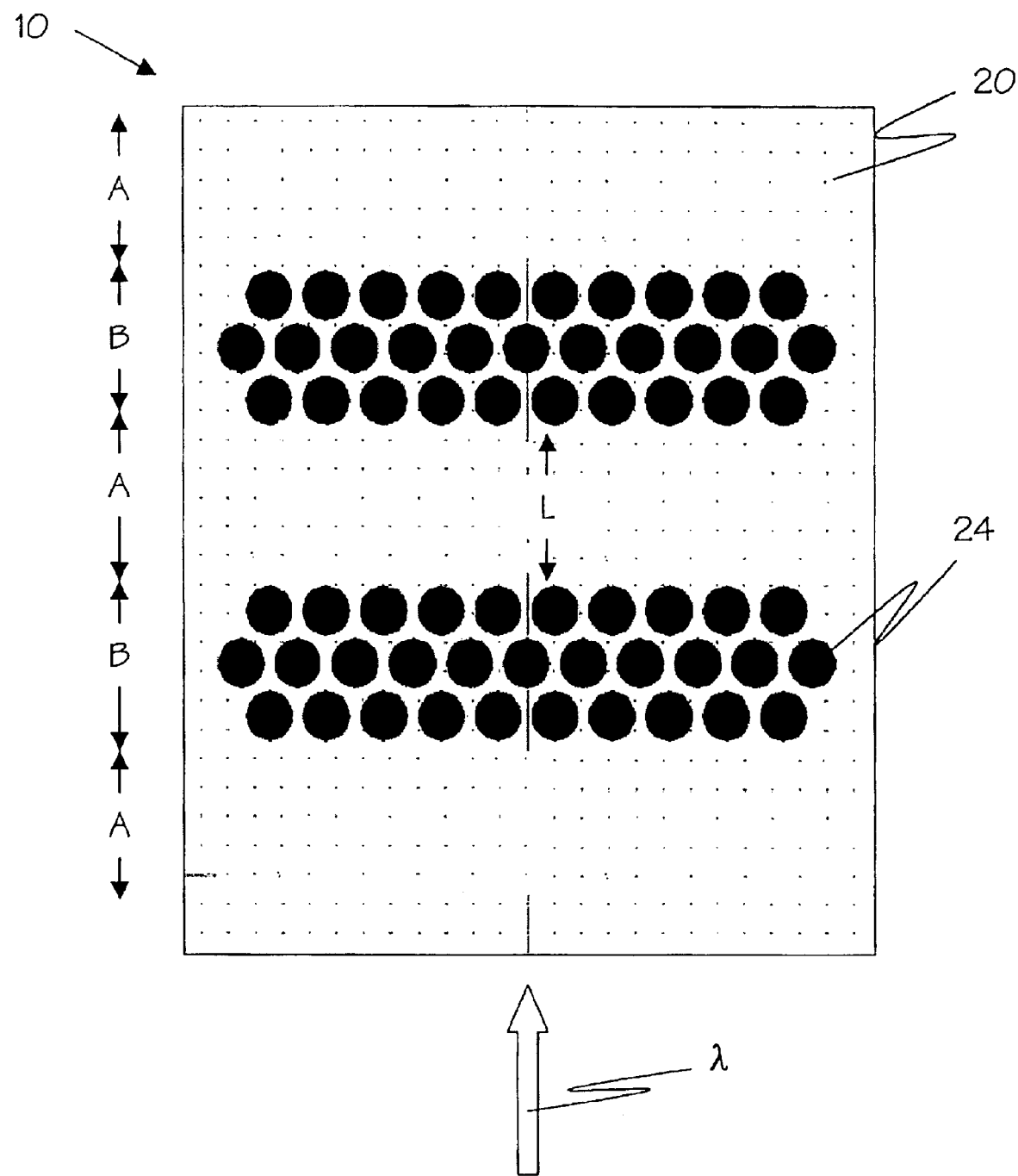
FIG. 3 is an illustration of an optical heterostructure according to another embodiment of the present invention.

Referring now to FIG. 3, it is contemplated that suitable optical bandgap properties may be achieved by eliminating the one of the sets of periodic inclusions from one of the band gap regions A, B, e.g., the first inclusions 22, and establishing an appropriate spacing L between the bandgap regions having the periodic inclusions 24. For example, in the context of a broadband input optical signal centered at a wavelength of about 1.55 μm, it is contemplated that suitable values for the spacing L between the bandgap regions B will range from about 0.5 μm to about 5 μm, and more particularly near about 1.0 μm.

In the context of optically functional waveguides, the matrix 20, the inclusions 22, 24, or both, may comprise an optically functional material such that it exhibits a substantial change in refractive index in response to a refractive index control parameter. For example, the optically functional material may comprises a non-linear photonic material, an electrooptic material, a thermo-optic material, a semiconductor, or combinations thereof. The control parameter may comprise the intensity of an optical signal propagating along the primary dimension of optical propagation, the intensity and distribution of an electric field across the heterostructure 10, the temperature of the heterostructure 10, the free carrier concentration in the heterostructure 10 or a portion thereof, or combinations thereof.

It follows that the present invention is also drawn to a method of controlling electromagnetic radiation. An input signal of electromagnetic radiation may be directed to an optical heterostructure 10 according to the present invention and one or more electromagnetic output signals may be collected there from—the characteristics of the output signal being a function of the input signal, the properties of the optical heterostructure 10, and/or a control parameter. The control parameter may be one of the varieties identified above and, as such, defines properties of the optical heterostructure 10, including, for example, the refractive index of a material within the heterostructure 10.

Although the optical waveguide 5 and the optical heterostructure 10 of the present invention are illustrated schematically in FIG. 2 as defining a two-dimensional bandgap structure, it is again noted that an optical waveguide 5 incorporating an optical heterostructure 10 according to the present invention may be presented as a three-dimensional bandgap structure. Suitable two and three-dimensional optical devices comprise components configured to function as an optical isolator, circulator, multiplexer, demultiplexer, wavelength locker, modulator, variable attenuator, dispersion compensator, power monitor, laser, amplifier, detector, router, switch, interleaver, or combinations thereof. Nothing in this disclosure is intended to limit the utility of the optical heterostructure of the present invention to a particular type of optical device.

An optical heterostructure 10 according to the present invention may be fabricated to have dimensions compatible with a wide variety of optical waveguides.

The present invention is further directed to a method of fabricating an optical heterostructure 10 according to the present invention. As can be gleaned from the description of the heterostructure 10 of the present invention, according to a suitable fabrication method, a periodic arrangements of first and second inclusions 22, 24 are defined and formed in a matrix 20 to define first and second bandgap regions A, B in the matrix.

The periodic arrangements of the first and second inclusions 22, 24 may be defined, for example, in an image transfer mask through electron beam lithography. The first and second inclusions may be formed by transferring an image from an image transfer mask to the matrix 20 through, for example, reactive ion etching. The periodic arrangements of the first and second inclusions 22, 24 are formed so as to alternate along the primary and/or orthogonal dimensions of optical propagation of the heterostructure device 10 to define a plurality of first bandgap regions A and a plurality of second bandgap regions B in a two or three-dimensional bandgap structure. The method may further comprise doping the matrix 20 or the inclusions 22, 24 with an optically active material.

Figure 5:
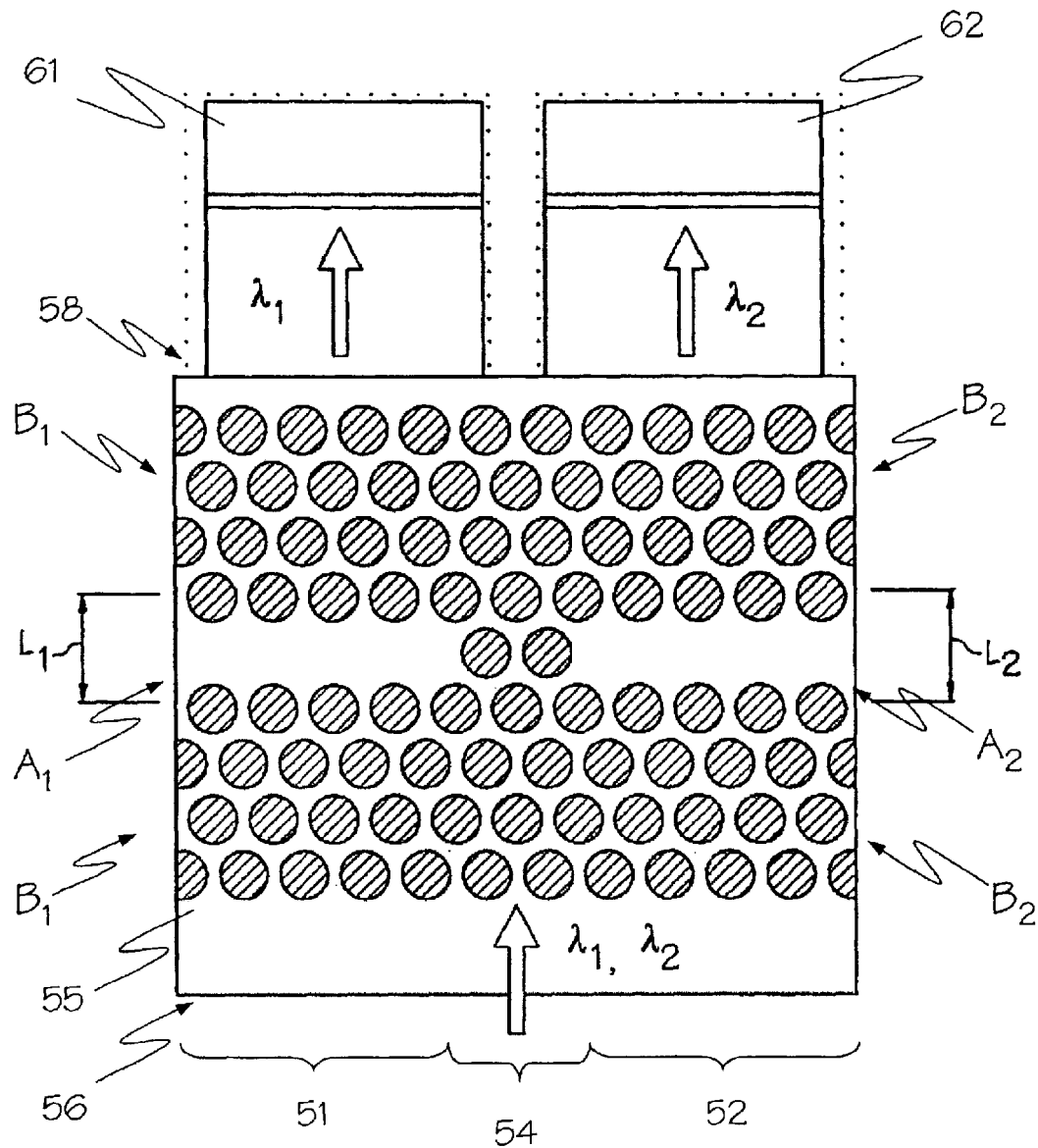
FIG. 5 is an illustration of a wavelength separation device according to one embodiment of the present invention.
Figure 6:
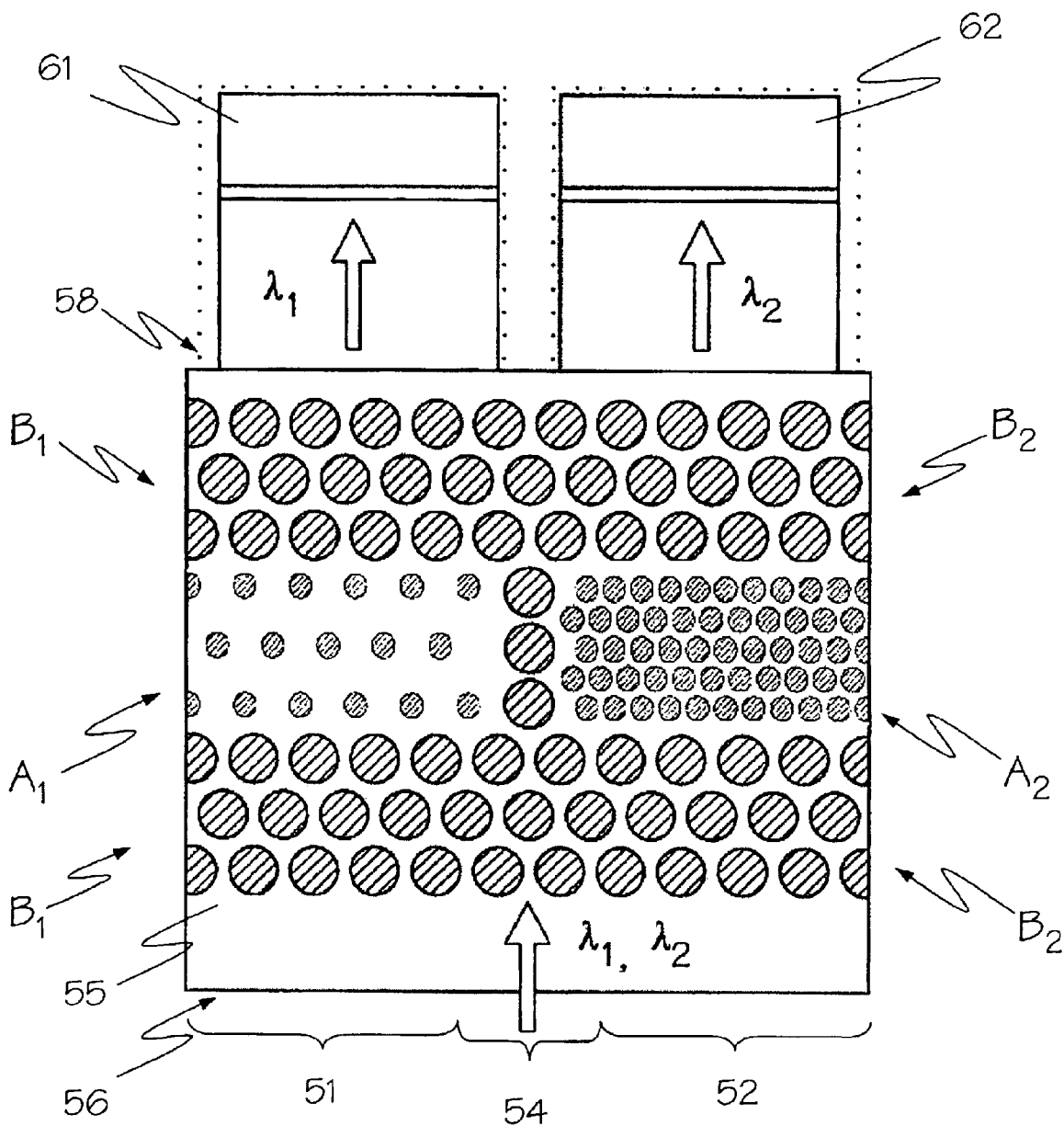
FIGS. 6 and 7 are illustrations of wavelength separation devices according to two alternative embodiments of the present invention.
Figure 7:
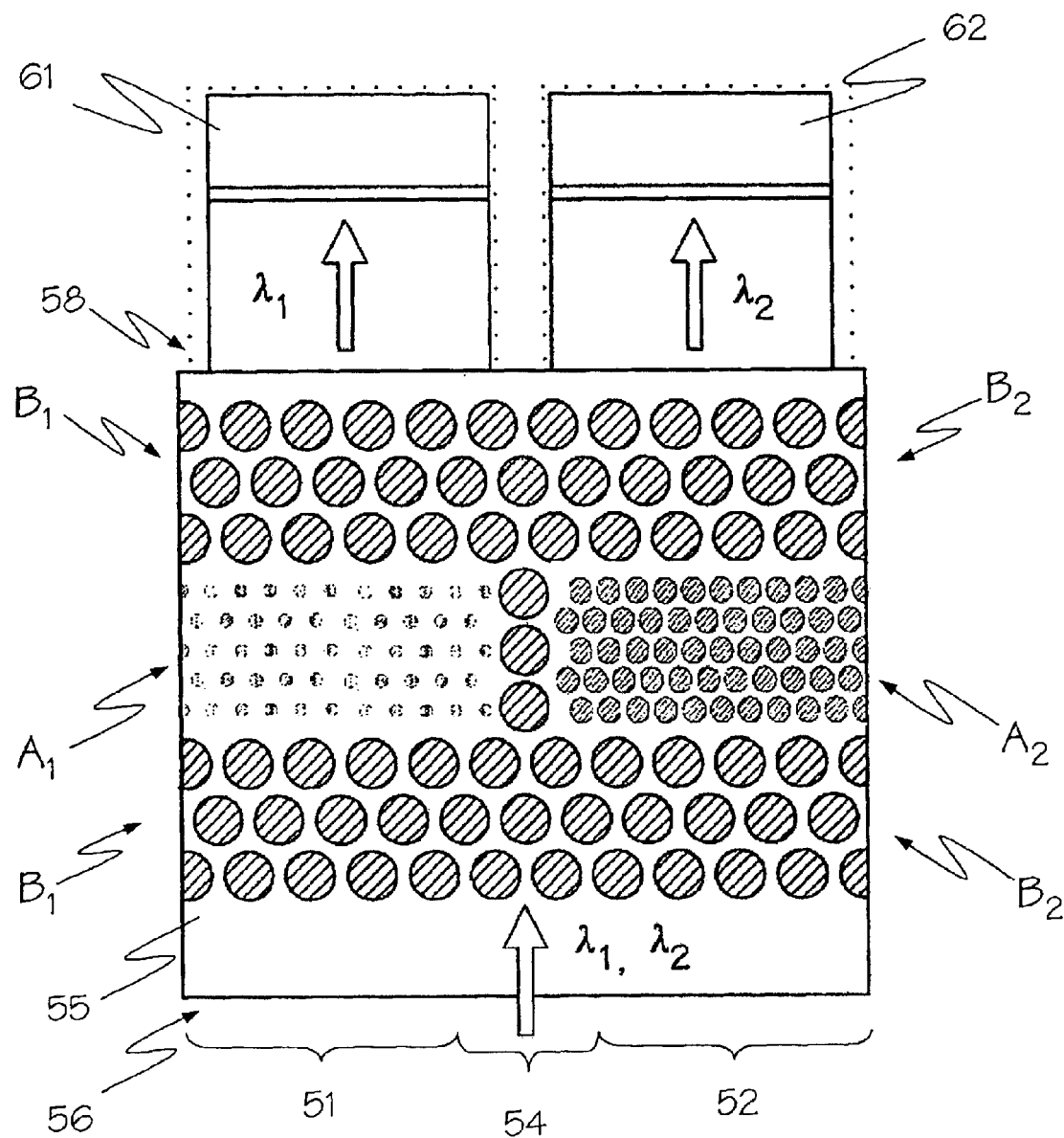

Referring collectively to FIGS. 5–7, a wavelength separation device 50 according to the present invention is illustrated. The wavelength separation device 50 comprises a plurality of optical heterostructures 51, 52, each characterized by a distinct transmission bandwidth $\lambda_1, \lambda_2$. The first optical heterostructure 51 comprises a first bandgap region $A_1$ and a second bandgap region $B_1$ defined in the matrix 55 of the heterostructure 51. As is discussed above with reference to the optical heterostructures of FIGS. 1 and 3, the first bandgap region $A_1$ of the first optical heterostructure 51 defines a first optical bandgap of the first optical heterostructure 51. Similarly, the second bandgap region $B_1$ of the first optical heterostructure 51 defines a second optical bandgap of the first optical heterostructure 51. The first optical bandgap of the first optical heterostructure 51 is centered at a different wavelength than the second optical bandgap of the first optical heterostructure 51. In this manner, as is described above with reference to FIGS. 1 and 3, a distinct transmission bandwidth $\lambda_1$ is defined between the first and second optical bandgaps of the first optical heterostructure 51.

Similarly, the additional optical heterostructure 52 comprises a first bandgap region $A_2$ and a second bandgap region $B_2$ defined in the matrix 55 of the heterostructure 52. The first bandgap region $A_2$ of the additional optical heterostructure 52 defines a first optical bandgap of the additional optical heterostructure 52. The second bandgap region $B_2$ of the second optical heterostructure 52 defines a second optical bandgap of the second optical heterostructure 52. The first optical bandgap of the additional optical heterostructure 52 is centered at a different wavelength than the second optical bandgap of the additional optical heterostructure 52. In this manner, an additional distinct transmission bandwidth $\lambda_2$ is defined between the first and second optical bandgaps of the additional optical heterostructure 52. Only one additional optical heterostructure 52 is illustrated in FIGS. 5–7 and it is noted that a plurality of additional heterostructures may be provided, each defining a distinct transmission bandwidth.

The wavelength separation device 50 comprises an input face 56 and an output face 58. The optical heterostructures 51, 52 are arranged between the input face 56 and the output face 58. The first and second transmission bandwidths $\lambda_1, \lambda_2$ are defined at the output face 58 as a result of the band pass characteristics of each of the optical heterostructures 51, 52, as described above. To enhance wavelength separation, the optical heterostructures 51, 52 may be separated by a zero bandwidth region 54 defining a zero transmission bandwidth output at the output face 58. Further, the transmission bandwidth outputs $\lambda_1, \lambda_2$ may be coupled to respective waveguides 61, 62. Typically, the matrices 55 of the optical heterostructures 51, 52 are integral, but it is contemplated that the material forming the matrix 55 may be different in each heterostructure 51, 52 to enhance wavelength separation. To further enhance wavelength separation, it is contemplated that a plurality of first and second bandgap regions $A_1$, $B_1$, $A_2$, $B_2$ of each optical heterostructure 51, 52 may be provided in alternating succession along a primary dimension of optical propagation of the wavelength separation device.

It is noted that the distinct transmission bandwidths $\lambda_1, \lambda_2$ of the optical heterostructures 51, 52 may be attributable to a difference between the respective magnitudes of spacings $L_1$, $L_2$ between the band gap regions B, as is illustrated in FIG. 5. The respective spacings $L_1$, $L_2$ are created by the interposition of the band gap region A there between. It is contemplated that the respective spacing magnitudes L1, L2 may vary by less than about 1% for dense wavelength division multiplexing and similar applications or, for coarse wavelength division multiplexing and similar applications, between about 1% and about 10%. In one embodiment of the present invention, with the wavelength of incident light centered about 1.55 $\mu$m, the respective spacing magnitudes L1, L2 are between about 0.5 $\mu$m and about 5 $\mu$m.

Referring to FIGS. 6 and 7, the bandgap regions $A_1$, $B_1$, $A_2$, $B_2$ may be characterized by a periodic arrangement of inclusions in the matrix, as is described above with reference to the heterostructure of FIG. 1. The distinct transmission bandwidth of each optical heterostructure 51, 52 may be attributable to variations in the respective inclusions of each optical heterostructure 51, 52. Specifically, in FIG. 6, the inclusions of each heterostructure 51, 52 vary in respective periodicities. In FIG. 7, the inclusions of each heterostructure 51, 52 vary in respective size. Respective inclusions of each heterostructure may also vary in shape, composition, or in any manner suitable for generating wavelength separation of the first and second inclusions, differences in respective compositions of the first and second inclusions, and combinations thereof.

It is noted that terms like "preferably," "commonly," "typically," and "including" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A wavelength separation device comprising a plurality of optical heterostructures, wherein:

said optical heterostructures are characterized by distinct transmission bandwidths;

each of said plurality of optical heterostructures comprises a first bandgap region and a second bandgap region defined in a matrix of said optical heterostructure;

said first and second bandgap regions of each of said optical heterostructures alternate in succession along respective dimensions of optical propagation of said heterostructure device;

said first and second bandgap regions define first and second optical bandgaps of each said optical heterostructures and are characterized by periodic arrangements of inclusions in said matrix; and said first optical bandgap of each of said optical heterostructures is centered at a different wavelength than said second optical bandgap of each of said optical heterostructures such that one of said transmission bandwidths is defined between each of said first and second optical bandgaps.

2. A wavelength separation device comprising a plurality of optical heterostructures characterized by distinct transmission bandwidths, wherein:

a first band gap region and a second bandgap region of a first optical heterostructure are defined in a matrix of said first optical heterostructure;

said first and second bandgap regions of said first optical heterostructure alternate in succession along a primary dimension of optical propagation of said heterostructure device;

said first bandgap region of said first optical heterostructure defines a first optical bandgap of said first optical heterostructure;

said first bandgap region of said first optical heterostructure is characterized by a periodic arrangement of inclusions in said matrix;

said inclusions of said first bandgap region of said first optical heterostructure have an index of refraction substantially different than said index of refraction of said matrix;

said second bandgap region of said first optical heterostructure defines a second optical bandgap of said first optical heterostructure;

said second bandgap region of said first optical heterostructure is characterized by a periodic arrangement of inclusions in said matrix;

said inclusions of said second bandgap region of said first optical heterostructure have an index of refraction substantially different than said index of refraction of said matrix;

said first optical bandgap of said first optical heterostructure is centered at a different wavelength than said second optical bandgap of said first optical heterostructure such that one of said distinct transmission bandwidths is defined between said first and second optical bandgaps of said first optical heterostructure;

a first bandgap region and a second bandgap region of an additional optical heterostructure are defined in a matrix of said additional optical heterostructure;

said first and second bandgap regions of said additional optical heterostructure alternate in succession along a primary dimension of optical propagation of said heterostructure device;

said first bandgap region of said additional optical heterostructure defines a first optical bandgap of said additional optical heterostructure;

said first bandgap region of said additional optical heterostructure is characterized by a periodic arrangement of inclusions in said matrix;

said inclusions of said first bandgap region of said additional optical heterostructure have an index of refraction substantially different than said index of refraction of said matrix;

said second bandgap region of said additional optical heterostructure defines a second optical bandgap of said additional optical heterostructure;

said second bandgap region of said first optical heterostructure is characterized by a periodic arrangement of inclusions in said matrix;

said inclusions of said second bandgap region of said first optical heterostructure have an index of refraction substantially different than said index of refraction of said matrix; and said first optical bandgap of said additional optical heterostructure is centered at a different wavelength than said second optical bandgap of said additional optical heterostructure such that an additional one of said distinct transmission bandwidths is defined between said first and second optical bandgaps of said additional optical heterostructure.

3. A wavelength separation device as claimed in claim 2 wherein said matrix of said first optical heterostructure is integral with said matrix of said additional optical heterostructure.

4. A wavelength separation device as claimed in claim 2 wherein said first optical heterostructure and second additional optical heterostructure are separated by a zero bandwidth region.

5. A wavelength separation device as claimed in claim 2 wherein:

said wavelength separation device comprises an input face and an output face; and said first and said additional optical heterostructure are arranged between said input face and said output face.

6. A wavelength separation device as claimed in claim 5 wherein:

said first optical heterostructure defines a first transmission bandwidth output at said output face; and said additional optical heterostructure defies an additional transmission bandwidth output at said output face.

7. A wavelength separation device as claimed in claim 6 wherein:

said first optical heterostructure and second additional optical heterostructure are separated by a zero bandwidth region;

said zero bandwidth region defines a zero transmission bandwidth output at said output face; and said first and said additional transmission bandwidth outputs are separated by said zero transmission bandwidth output.

8. A wavelength separation device as claimed in claim 6 wherein said first and said additional transmission bandwidth outputs are coupled to respective first and additional waveguides.

9. A wavelength separation device as claimed in claim 2 wherein a distinct transmission bandwidth of at least one of said optical heterostructures is attributable to a magnitude of a spacing between band gap regions of said second type in said optical heterostructure.

10. A wavelength separation device as claimed in claim 9 wherein said spacing between band gap regions of said second type is created by interposition of a band gap region of said first type there between.

11. A wavelength separation device as claimed in claim 2 wherein distinct transmission bandwidths of said first optical heterostructure and said additional optical heterostructure are attributable to a variance in respective spacing magnitudes $L_1$, $L_2$ between band gap regions of said second type in said first optical heterostructure and band gap regions of said second type in said additional optical heterostructure.

12. A wavelength separation device as claimed in claim 11 wherein said respective spacing magnitudes $L_1$, $L_2$ vary by less than about 1%.

13. A wavelength separation device as claimed in claim 11 wherein said respective spacing magnitudes $L_1$, $L_2$ vary by about 1% to about 10%.

14. A wavelength separation device as claimed in claim 11 wherein said respective spacing magnitudes $L_1$, $L_2$ are between about 0.5 $\mu$m and about 5 $\mu$m.

15. A wavelength separation device as claimed in claim 2 wherein:

said first bandgap region of at least one of said optical heterostructures is characterized by a periodic arrangement of first inclusions in said matrix; and said second bandgap region of at least one of said optical heterostructures is characterized by a periodic arrangement of second inclusions in said matrix.

16. A wavelength separation device as claimed in claim 15 wherein a distinct transmission bandwidth of at least one of said optical heterostructures is attributable to variations in said first and second inclusions of said optical heterostructure.

17. A wavelength separation device as claimed in claim 16 wherein said variations are selected from differences in respective sizes of said first and second inclusions, differences in respective periodicities of said first and second inclusions, differences in respective compositions of said first and second inclusions, and combinations thereof.

18. A wavelength separation device as claimed in claim 2 wherein:

said first bandgap region of said first optical heterostructures is characterized by a periodic arrangement of first inclusions in said matrix; and said second bandgap region of said additional optical heterostructures is characterized by a periodic arrangement of second inclusions in said matrix.

19. A wavelength separation device as claimed in claim 18 wherein distinct transmission bandwidths of both said first optical heterostructure and said additional optical heterostructure are attributable to variations in said first and second inclusions of said optical heterostructures.

20. A wavelength separation device as claimed in claim 2 wherein said first and second bandgap regions of at least one of said optical heterostructures alternate in succession along a primary dimension of optical propagation of said wavelength separation device to define a succession including at least one bandgap region of said first type interposed between a pair of bandgap regions of said second type.

* * * * *

UNITED STATES PATENT AND TRADEMARK OFFICE
CERTIFICATE OF CORRECTION

PATENT NO. : 6,934,441 B2 Page 1 of 1
APPLICATION NO. : 10/658122
DATED : August 23, 2005
INVENTOR(S) : James E. Toney It is certified that error appears in the above-identified patent and that said Letters Patent is hereby corrected as shown below:

Col. 2, Line 57, "band gap" should read --bandgap--
Col. 2, Line 59, "band gap" should read --bandgap--
Col. 2, Line 64, "band gap" should read --bandgap--
Col. 5, Line 13, "band gap" should read --bandgap--
Col. 7, Line 17, "band gap" should read --bandgap--
Col. 7, Line 19, "band gap" should read --bandgap--
Col. 8, Line 30, "band gap" should read --bandgap--
Col. 10, Line 4, "band gap" should read --bandgap--
Col. 10, Line 7, "band gap" should read --bandgap--
Col. 10, Line 8, "band gap" should read --bandgap--
Col. 10, Line 14, "band gap" should read --bandgap--
Col. 10, Line 15, "band gap" should read --bandgap--

Signed and Sealed this

Twenty-sixth Day of June, 2007

JON W. DUDAS
*Director of the United States Patent and Trademark Office*